(12) United States Patent
Zhang

(10) Patent No.: US 9,703,136 B2
(45) Date of Patent: Jul. 11, 2017

(54) HEAT RADIATION OF THE LIQUID CRYSTAL MODULE

(71) Applicant: SHENZHEN CHINA STAR OPTOELECTRONICS TECHNOLOGY CO., LTD., Shenzhen, Guangdong (CN)

(72) Inventor: Yanxue Zhang, Guangdong (KR)

(73) Assignee: SHENZHEN CHINA STAR OPTOELECTRONICS TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 14/370,251

(22) PCT Filed: Jan. 23, 2014

(86) PCT No.: PCT/CN2014/071262
§ 371 (c)(1),
(2) Date: Jul. 2, 2014

(87) PCT Pub. No.: WO2015/106463
PCT Pub. Date: Jul. 23, 2015

(65) Prior Publication Data
US 2016/0327830 A1    Nov. 10, 2016

(30) Foreign Application Priority Data

Jan. 20, 2014   (CN) .......................... 2014 1 0026426

(51) Int. Cl.
*G02F 1/1333* (2006.01)
*G02F 1/1335* (2006.01)
*F21V 8/00* (2006.01)

(52) U.S. Cl.
CPC ....... *G02F 1/133385* (2013.01); *G02B 6/001* (2013.01); *G02B 6/0085* (2013.01); *G02F 1/1336* (2013.01); *G02F 2001/133628* (2013.01)

(58) Field of Classification Search
CPC ............. G02F 1/1336; G02F 1/133385; G02F 2001/133628; G02B 6/001; G02B 6/0085
(Continued)

(56) References Cited

U.S. PATENT DOCUMENTS

| 8,970,800 | B2* | 3/2015 | Kuo ................... H05K 7/20963 349/161 |
| 2001/0024250 | A1* | 9/2001 | Fujishiro ............... G02F 1/1336 349/65 |

(Continued)

FOREIGN PATENT DOCUMENTS

| CN | 201866637 U | 6/2011 |
| CN | 102135269 A | 7/2011 |

(Continued)

OTHER PUBLICATIONS

Cheng Cheng, the International Searching Authority written comments, May 2014, CN.

*Primary Examiner* — Hoan C Nguyen

(57) ABSTRACT

The present invention provides a heat radiation of the liquid crystal module, which located around the LED source of the liquid crystal module, wherein the heat radiation comprising a plurality of radiating fins which located at the side walls of the LED source and the backlight panel. The radiating fins can be molded by bending, which can be adhered together on the side wall of the backlight panel. With adding the layer of the radiating fins, the radiating fins bonding and adhering to the back of the backlight panel, the radiating area is increasing and the heat radiation efficiency of the liquid crystal module improving in the limiting space of the liquid (Continued)

crystal module. The problem is resolved that lacking of the heat radiating area in the present liquid crystal module.

8 Claims, 1 Drawing Sheet

(58) Field of Classification Search
USPC .................................................. 349/20, 58
See application file for complete search history.

(56) References Cited

U.S. PATENT DOCUMENTS

| | | | | |
|---|---|---|---|---|
| 2001/0026430 A1* | 10/2001 | Onizuka | ............ | B60R 16/0238 |
| | | | | 361/103 |
| 2007/0211205 A1* | 9/2007 | Shibata | ............ | G02F 1/133603 |
| | | | | 349/161 |
| 2009/0219724 A1* | 9/2009 | Wang | ................ | G02F 1/133308 |
| | | | | 362/362 |
| 2012/0020114 A1* | 1/2012 | Miyamoto | ........... | G02B 6/0085 |
| | | | | 362/612 |
| 2013/0208509 A1* | 8/2013 | Cheng | ............... | G02F 1/133382 |
| | | | | 362/613 |
| 2014/0036197 A1* | 2/2014 | Furusho | ............ | G02F 1/133308 |
| | | | | 349/58 |
| 2014/0254192 A1* | 9/2014 | Do | ....................... | G02B 6/0051 |
| | | | | 362/606 |

FOREIGN PATENT DOCUMENTS

| | | | |
|---|---|---|---|
| CN | 202118669 U | | 1/2012 |
| CN | 202134572 U | | 2/2012 |
| CN | 102661554 A | | 9/2012 |
| CN | 103335253 A | | 10/2013 |
| JP | 2004172379 A | * | 6/2004 |
| JP | 2013134942 A | | 7/2013 |

* cited by examiner

HEAT RADIATION OF THE LIQUID CRYSTAL MODULE

FIELD OF THE INVENTION

The present invention relates to a liquid crystal module, and more particularly to a heat radiation of the liquid crystal module.

BACKGROUND OF THE INVENTION

In the traditional liquid crystal module, the thickness of the module body will be no necessary to be thinner. The currently resolve way on heat radiating is to enlarge the width of the radiating fins. With the development of the liquid crystal technology, the liquid crystal module will be made to be thinner and lighter. In the limiting space of the module, the heat radiation problem is not easy to be resolved.

SUMMARY OF THE INVENTION

On account of the lack of the prior art, the object of the present invention is to provide a heat radiation with enlarging the radiating area of the liquid crystal module.

The present invention provides a heat radiation of the liquid crystal module, which located around the LED source of the liquid crystal module. The heat radiation comprises a plurality of radiating fins which located at the side walls of the LED source and the backlight panel.

Perfectly, the heat radiation comprises at least two radiating fins which be molded by bending. The radiating fins can be adhered together on the side wall of the backlight panel.

Perfectly, the thickness and the width of each radiating fin is equal.

Compared to the prior art, in the heat radiation of the liquid crystal module of the present invention, with adding the layer of the radiating fins, the radiating fins bonding and adhering to the back of the backlight panel, the radiating area is increasing and the heat radiation efficiency of the liquid crystal module improving in the limiting space of the liquid crystal module. Therefore, the problem is resolved that lacking of the heat radiating area in the present liquid crystal module. On the way of bond molding, the radiating fins are fixed together without fasteners. It is easy to form and reduce the manufacture cost with the adhering with the two radiating fins.

DETAILED DESCRIPTION OF THE PREFERRED EMBODIMENTS

Figure 1:
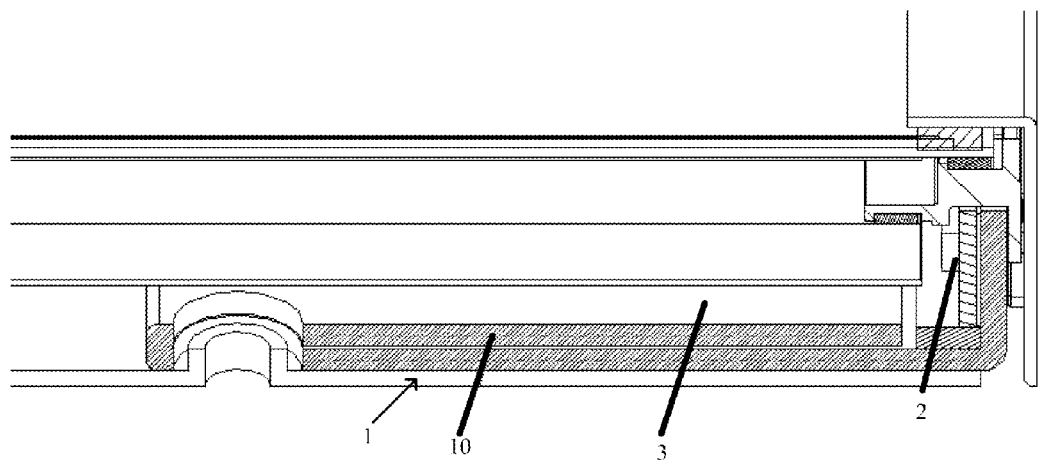
FIG. 1 is a sectional view of the heat radiation of the liquid crystal module according to the present invention.

For improving the heat radiating effect of the heating elements in the liquid crystal module, the present invention provides a heat radiation of the liquid crystal module 1, which located around the LED source 2 of the liquid crystal module. The heat radiation 1 comprises a plurality of radiating fins 10 which located at the side walls of the LED source 2 and the backlight panel 3.

Figure 2:
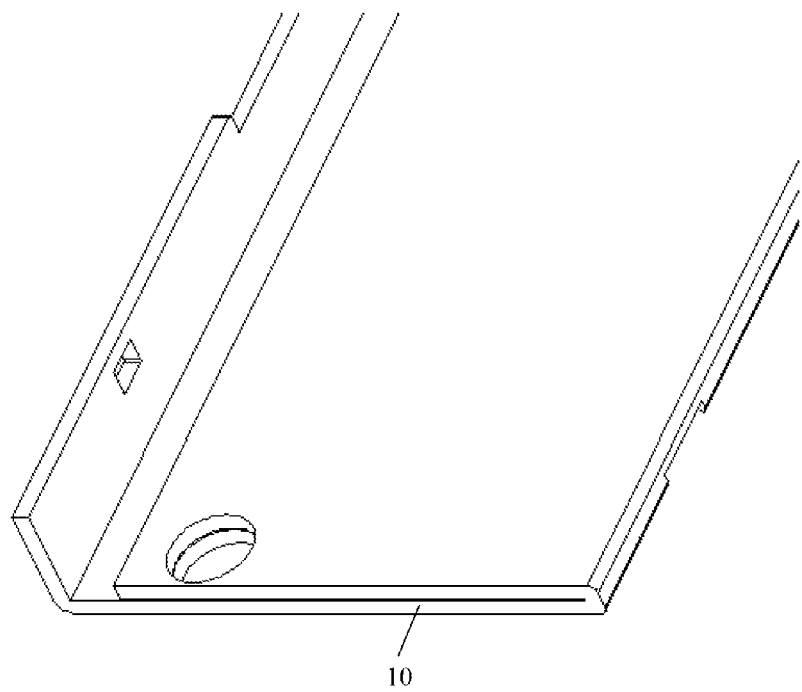
FIG. 2 is a part-perspective view of the heat radiation of the liquid crystal module according to the present invention.

Please refer to FIG. 1 and FIG. 2, the heat radiation 1 is mounted within the liquid crystal module. In order to radiate heat rapidly, the heat radiation 1 can be mounded around the LED source 2 and the backlight panel 3. The heat radiation 1 comprises a plurality of radiating fins 10. In the present embodiment, there are two radiating fins 10 paralleling and folding to each other, and adhering to the hottest part of the liquid crystal module. That is to say, the radiating fins 10 are folding and adhering between the backlight panel 3 and the shell. The radiating fins 10 can be molded by bending. The radiating fins 10 are bending along the shape of the shell of the liquid crystal module. One end of the radiating fins 10 is adhering to the back of the LED source 2 so as to radiate heat from the LED source 2; and the other end of the radiating fins 10 is bending to be a right-angle and extending along the backlight panel 3. The two radiating fins 10 are paralleling and adhering to each other. With the radiating area of the radiating fins 10 increasing, the radiating area of the backlight fins and LED source are increasing obviously in the limiting space of the liquid crystal module, as a result the radiating efficiency of the whole liquid crystal module will be improved significantly for satisfying the high efficient demand on the radiating and the light-weight on the structure of the liquid crystal module.

In the present invention, the heat radiation 1 comprises a plurality of radiating fins 10. For example, the radiating fins are 2-4 layers, perfectly, the radiating fins are two layers. With the layer of the radiating fins increasing, the radiating area is enlarger. The thickness and the width of the radiation fins are equal to each other.

In the heat radiation of the liquid crystal module, with adding the layer of the radiating fins, the radiating fins bonding and adhering to the back of the backlight panel, the radiating area is increasing and the heat radiation efficiency of the liquid crystal module improving in the limiting space of the liquid crystal module. Therefore, the problem is resolved that lacking of the heat radiating area in the present liquid crystal module. On the way of bond molding, the radiating fins are fixed together without fasteners. It is easy to form and reduce the manufacture cost with the adhering with the two radiating fins.

What is claimed is:

1. A heat radiation structure of a liquid crystal module, the liquid crystal module comprises a backlight panel and an LED source located one side of the backlight panel to form as side backlight of the liquid crystal module; the heat radiation structure comprising a first extension portion having at least two layers mounted behind the backlight panel and a second extension portion bending from the first extension portion, which located behind the LED source; and the second extension portion comprising one layer and the at least two layers of the first extension portion folded parallel and directly to each other, wherein one layer of the first extension portion covers completely the other layer of the first extension portion.

2. The heat radiation structure of the liquid crystal module according to claim 1, wherein the at least two layers are adhered together behind the backlight panel.

3. The heat radiation structure of the liquid crystal module according to claim 2, wherein a thickness of each layer of the first extension portion is equal.

4. The heat radiation structure of the liquid crystal module according to claim 2, wherein a width of each layer of the first extension portion is equal.

5. A liquid crystal module, comprises
a backlight panel;

an LED source located one side of the backlight panel to form a side backlight of the liquid crystal module;

a heat radiation structure having a first extension portion having at least two layers mounted behind the backlight panel and a second extension portion bending from the first extension portion, which located behind the LED source; and the second extension portion comprising one layer and the at least two layers of the first extension portion folded parallel and directly to each other, wherein one layer of the first extension portion covers completely the other layer of the first extension portion.

6. The liquid crystal module according to claim 5, wherein the at least two layers are adhered together behind the backlight panel.

7. The liquid crystal module according to claim 6, wherein a thickness of each layer of the first extension portion is equal.

8. The liquid crystal module according to claim 6, wherein a width of each layer of the first extension portion is equal.

* * * * *